United States Patent
Baker

(10) Patent No.: US 6,233,949 B1
(45) Date of Patent: May 22, 2001

(54) PORTABLE DEVICE FOR WEARING BY A USER AND REMOVING DEPOSITS FROM A SURFACE

(76) Inventor: Kane K. Baker, 1246 N. Lake Way, Palm Beach, FL (US) 33480

( * ) Notice: Subject to any disclaimer, the term of this patent is extended or adjusted under 35 U.S.C. 154(b) by 0 days.

(21) Appl. No.: 09/436,735

(22) Filed: Nov. 9, 1999

(51) Int. Cl.$^7$ .................................................. F25D 13/04
(52) U.S. Cl. ............................................................ 62/64
(58) Field of Search ..................................................... 62/64

(56) References Cited

U.S. PATENT DOCUMENTS

| | | | |
|---|---|---|---|
| 3,263,439 | * 8/1966 | Ross | 62/228 |
| 4,157,016 | 6/1979 | Wendt et al. | 62/123 |
| 4,409,034 | 10/1983 | Williams | 134/4 |
| 5,027,546 | * 7/1991 | Tallon | 43/124 |
| 5,179,840 | 1/1993 | Worsfold | 62/64 |
| 5,237,836 | * 8/1993 | Byrne et al. | 62/385 |
| 5,271,234 | 12/1993 | Carter et al. | 62/64 |
| 5,606,860 | 3/1997 | Popp et al. | 62/63 |
| 5,802,857 | 9/1998 | Radkowski et al. | 62/63 |

* cited by examiner

Primary Examiner—William Doerrler
Assistant Examiner—Malik N. Drake
(74) Attorney, Agent, or Firm—Richard L. Miller P.C.

(57) ABSTRACT

A portable device for wearing by a user and removing deposits from a surface. The device includes a first portion for delivering a fluid that is a cryogen and a second portion for overlying and dispensing the fluid onto and removing the deposits from the surface. The first portion includes a pole for hand-holding, a fitting that fluidly engages in the pole, a first valve that fluidly engages the fitting, a hose that fluidly engages the first valve, a second valve that fluidly engages the hose, a portable tank that fluidly engages the second valve and which contains the fluid which flows through the second valve when opened, through the hose, to the first valve, which when opened, allows the fluid to flow into the fitting and into the pole, and a harness that is operatively connected to the portable tank for attaching the portable tank to the back of the user or to the pole during use. The second portion includes a vessel that is inverted bowl-shaped, fluidly depends from the pole so as to allow the fluid to flow from the pole therein and be focused onto a specific and defined area, and a peripheral seal that extends around the rim of the vessel for providing temporary sealing engagement of the vessel with the surface during use so as to prevent escaping of the fluid.

17 Claims, 1 Drawing Sheet

PORTABLE DEVICE FOR WEARING BY A USER AND REMOVING DEPOSITS FROM A SURFACE

BACKGROUND OF THE INVENTION

1. Field of the Invention

The present invention relates to a portable device. More particularly, the present invention relates to a portable device for wearing by a user and removing deposits from a surface.

2. Description of the Prior Art

Numerous innovations for cryogenic cleaning devices have been provided in the prior art that will be described. Even though these innovations may be suitable for the specific individual purposes to which they address, however, they differ from the present invention.

A FIRST EXAMPLE, U.S. Pat. No. 4,157,016 to Wendt et al. teaches a method and machine for cleaning and restoring sand beaches which have become contaminated by oil spills. The machine travels on the beach and sprays liquid nitrogen onto the contaminated area, thereby solidifying the oil and sand mixture so that the mixture can be separated from the underlying uncontaminated sand and be efficiently removed from the beach and transported to a remote site for disposal or further treatment.

A SECOND EXAMPLE, U.S. Pat. No. 4,409,034 to Williams teaches a cryogenic liquid that is used to directly or indirectly cool solid or liquid contaminants adhering to apparatus surfaces to effect a change in the physical characteristics of the contaminants and thereby render them more susceptible to removal operations. The direct technique contemplates providing a source of liquid cryogen, contacting the liquid cryogen from the source thereof directly with the contaminated surfaces of the apparatus to effect at least a partial bonding separation from the apparatus surface, and effectively removing the contaminant material, while the indirect technique contemplates utilizing an existing system for circulating heated fluid within the apparatus by preventing the flow of hot fluid into the existing conduit channels, selectively and removably coupling adjacent conduit channels to effect a change of flow from a series flow pattern to a parallel flow pattern, permitting cryogenic liquid to flow into the conduit channels, allowing cryogenic liquid to circulate therein for a predetermined period of time to effect a manageable property change of the contaminant material, and removing the contaminant material therefrom.

A THIRD EXAMPLE, U.S. Pat. No. 5,179,840 to Worsfold teaches an article such as a mattress, carpet or curtain that is treated by spraying its surface with liquid cryogen (usually nitrogen). The liquid nitrogen acts as an acaricide and kills house dust mites. The dead mites are then removed from the freshly sprayed fabric. Such a treatment is also effective in dislodging particles of dirt from the articles and may be used for example to clean a carpet in situ. After treatment with the liquid nitrogen, the carpet may be subjected to a conventional vacuum cleaning.

A FOURTH EXAMPLE, U.S. Pat. No. 5,271,234 to Carter et al. teaches a method for removing tile adhered by a substance to a floor that includes the step of enclosing a volume generally above an area of the floor and tile, with the tile and floor defining the bottom of the volume enclosed. The temperature in the volume enclosed is reduced so that the substance adhering the tile to the floor becomes embrittled. The apparatus is maintained in position over the area of the floor for a predetermined time to produce the required embrittlement of the adhering substance, and then moved to expose the area of the floor previously below the volume enclosed. The title is then removed from the floor. An apparatus for use in the method is also disclosed.

A FIFTH EXAMPLE, U.S. Pat. No. 5,606,860 to Pop et al. teaches a method and apparatus for the cleaning of residue from the surface of a container where the method comprises adhering a bulk material to the residue, cooling the container and residue adhered to the container surface to a low temperature, substantially embrittling the residue and then impacting the container to fragment and separate the residue from the surface of the container. The cooling may be effected to multiple containers in a semi-continuous fashion placing the containers sequentially in one end of an enclosure, contacting cold cryogen to the residue and container, advancing the containers to the other end of the enclosure and withdrawing the containers sequentially.

A SIXTH EXAMPLE, U.S. Pat. No. 5,802,857 to Radkowski et al. teaches an apparatus for forming a fibrous mat, fibers and binder that are collected on a moving continuous, foraminous collection chain conveyor to form the fibrous mat as the collection chain conveyor travels through a collection chamber. After the fibrous mat is formed on the collection chain conveyor, the fibrous mat is removed from the collection chain conveyor for further processing leaving a residue of fibers and binder on and in openings of the collection chain conveyor. Prior to again traveling through the collection chamber, the collection chair conveyor is cryogenically cleaned by applying a cryogenic liquid (e.g. nitrogen) to the collection chain conveyor to freeze the residue of fibers and binder and by mechanically removing the frozen residue of fibers and binder from the collection chain conveyor, e.g. by agitating, beating and/or brushing the collection chain conveyor.

It is apparent that numerous innovations for cryogenic cleaning devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a portable device for wearing by a user and removing deposits from a surface that avoids the disadvantages of the prior art.

ANOTHER OBJECT of the present invention is to provide a portable device for wearing by a user and removing deposits from a surface that is simple and inexpensive to manufacture.

STILL ANOTHER OBJECT of the present invention is to provide a portable device for wearing by a user and removing deposits from a surface that is simple to use.

BRIEFLY STATED, YET ANOTHER OBJECT of the present invention is to provide a portable device for wearing by a user and removing deposits from a surface. The device includes a first portion for delivering a fluid that is a cryogen and a second portion for overlying and dispensing the fluid onto and removing the deposits from the surface. The first portion includes a pole for hand-holding, a fitting that fluidly engages in the pole, a first valve that fluidly engages the fitting, a hose that fluidly engages the first valve, a second valve that fluidly engages the hose, a portable tank that fluidly engages the second valve and which contains the fluid which flows through the second valve when opened, through the hose, to the first valve, which when opened, allows the fluid to flow into the fitting and into the pole, and a harness that is operatively connected to the portable tank for attaching the portable tank to the back of the user or to the pole during use. The second portion includes a vessel that is inverted bowl-shaped, fluidly depends from the pole so as allow the fluid to flow from the pole therein and be focused onto a specific and defined area, and a peripheral seal that extends around the rim of the vessel for providing temporary sealing engagement of the vessel with the surface during use so as to prevent escaping of the fluid.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

LIST OF REFERENCE NUMERALS UTILIZED IN THE DRAWING

Figure 1:
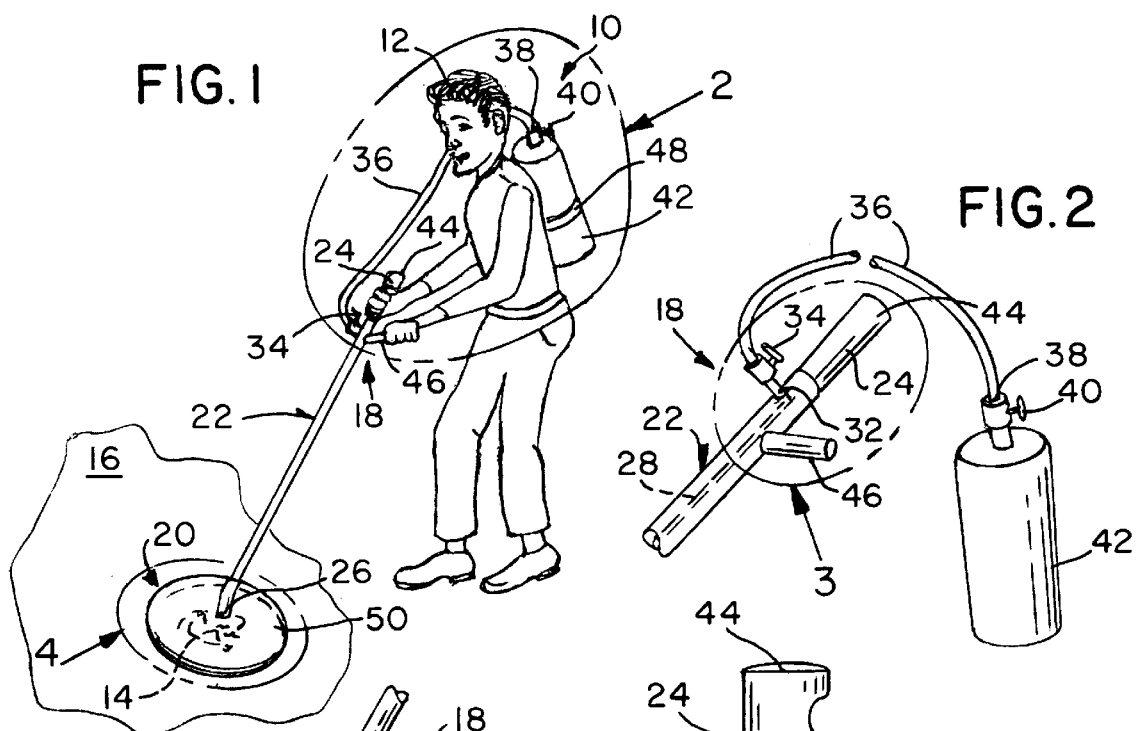
FIG. 1 is a diagrammatic perspective view of the present invention in use.

Preferred Embodiment 10 portable device of the present invention for wearing by user 12 and removing deposits 14 from surface 16
12 user
14 deposits
16 surface
18 first portion for delivering fluid
20 second portion for overlying and dispensing fluid onto and removing deposits 14 from surface 16
22 pole of first portion 18 for hand-holding
24 proximal end of pole 22 of first portion 18
26 distal end of pole 22 of first portion 18
28 main duct in pole 22 of first portion 18
30 secondary duct in pole 22 of first portion 18
32 fitting of first portion 18
34 first valve of first portion 18
36 hose of first portion 18
38 end of hose 36 of first portion 18
40 second valve of first portion 18
42 portable tank of first portion 18
44 elastomer of first portion 18 for facilitating gripping by one hand of user 12
46 handle of first portion 18 for facilitating gripping by other hand of user 12
48 harness of first portion 18 for attaching portable tank 42 to back of user 12 during use
50 vessel of second portion 20
52 rim of vessel 50 of second portion 20 for facing surface 16
54 peripheral seal on rim 52 of vessel 50 of second portion 20 for providing temporary sealing engagement of vessel 50 of second portion 20 with surface 16 during use so as to prevent escaping of liquid during use

Alternate Embodiment 118 first portion
122 pole of first portion 118
136 hose of first portion 118
142 portable tank of first portion 118
148 harness of first portion 118

DETAILED DESCRIPTION OF THE PREFERRED EMBODIMENT

Referring now to the figures, in which like numerals indicate like parts, and particularly to FIG. 1, the portable device of the present invention is shown generally at 10 for wearing by a user 12 and removing deposits 14 from a surface 16.

The overall configuration of the portable device 10 can best. be seen in FIG. 1, and as such, will be discussed with reference thereto.

The portable device 10 comprises a first portion 18 for delivering a fluid and a second portion 20 fluidly communicating with the first portion 18 for overlying and dispensing the fluid onto and removing the deposits 14 from the surface 16.

Figure 2:
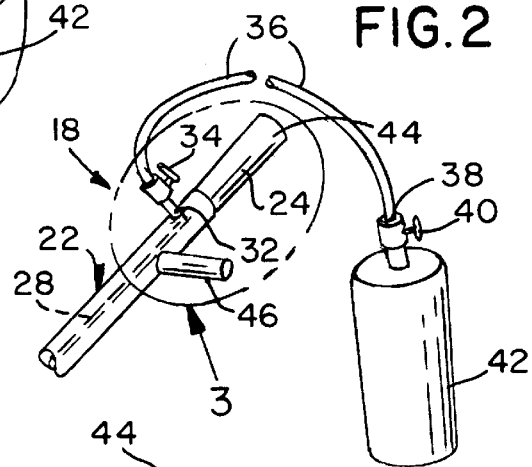
FIG. 2 is an enlarged diagrammatic perspective view of the area generally enclosed by the dotted curve identified by arrow 2 in FIG. 1 of a first portion of the present invention.
Figure 3:
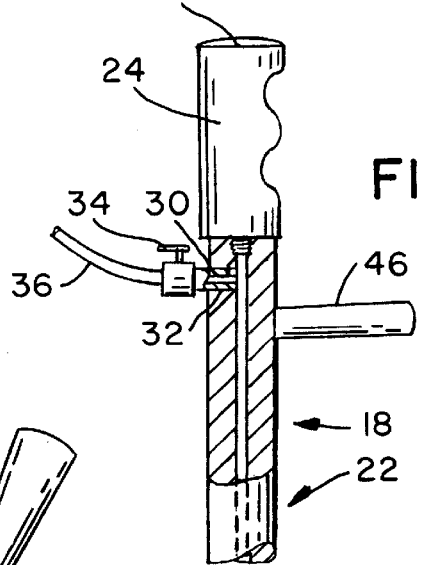
FIG. 3 is an enlarged diagrammatic side elevational view in partial section of the area generally enclosed by the dotted curve identified by arrow 3 in FIG. 2.

The specific configuration of the first portion 18 can best be seen in FIGS. 1–3, and as such, will be discussed with reference thereto.

The first portion 18 comprises a pole 22 for hand-holding and which is slender, elongated, and has a proximal end 24, a distal end 26, a main duct 28 that runs axially therethrough from the proximal end 24 thereof to the distal end 26 thereof, and a secondary duct 30 that extends laterally from, and fluidly communicates with, the main duct 28 in the pole 22, through the pole 22, in close proximity to the proximal end 24 of the pole 22.

The first portion 18 further comprises a fitting 32 that fluidly engages in the secondary duct 30 in the pole 22, and extends outwardly therefrom.

The first portion 18 further comprises a first valve 34 that fluidly engages the fitting 32 of the first portion 18.

The first portion 18 further comprises a hose 36 that fluidly engages the valve 34 of the first portion 18 and terminates in an end 38.

The first portion 18 further comprises a second valve 40 that fluidly engages the end 38 of the hose 36.

The first portion 18 further comprises a portable tank 42 that fluidly engages the second valve 40 of the first portion 18, and which contains the fluid which flows through the second valve 40 of the first portion 18 when opened, through the hose 36 of the first portion 18, until it reaches the first valve 34 of the first portion 18, which when opened, allows the fluid to flow into the fitting 32 of the first portion 18 and into the main duct 28 in the pole 22.

The fluid contained in the portable tank 42 of the first portion 18 is a liquid.

The liquid fluid contained in the portable tank 42 of the first portion is liquid nitrogen.

The fluid contained in the portable tank 42 of the first portion 18 is a gas.

The fluid contained in the portable tank 42 of the first portion 18 is cold so as to freeze the deposit and cause it to be removed from the surface 16.

The cold fluid contained in the portable tank 42 is a cryogen.

The first portion 18 further comprises an elastomer 44 that form fits to the proximal end 24 of the pole 22 for facilitating gripping by one hand of the user 12.

The first portion 18 further comprises a handle 46 that is slender and extends laterally outwardly from the pole 22 of the first portion 18, in substantial diametrical alignment with the fitting 32 for facilitating gripping by the other hand of the user 12.

The first portion 18 further comprises a harness 48 that is operatively connected to the portable tank 42 for attaching the portable tank 42 to the back of the user 12 during use, and with the hose 36 of the second portion 18 being appropriately sized.

The distal end 26 of the pole 22 is bent obtusely so as to be perpendicular to the surface 16 when the pole 22 of the first portion 18 is held at a comfortable angle by the user 12 during use.

Figure 4:
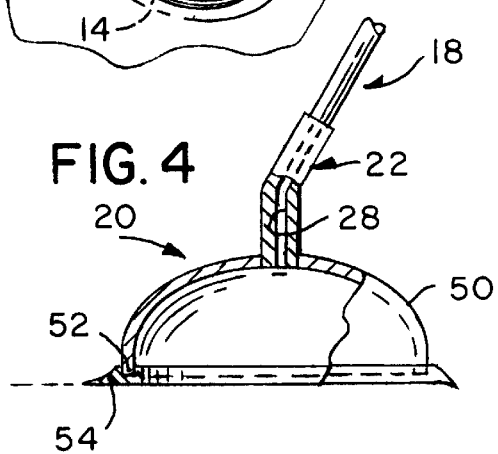
FIG. 4 is an enlarged diagrammatic side elevational view in partial section of the area generally enclosed by the dotted curve identified by arrow 4 in FIG. 1 of a second portion of the present invention.

The specific configuration of the second portion 20 can best be seen in FIGS. 1 and 4, and as such, will be discussed with reference thereto.

The second portion 20 comprises a vessel 50 that is inverted bowl-shaped, fluidly depends from the distal end 26 of the pole 22 so as to allow the fluid to flow from the pole 22 of the first portion 18 therein and be focused onto a specific and defined area while providing a barrier for containing the fluid from the surrounding area for maximum effect while keeping it a liquid longer by not allowing dilution and reaction to temperature of the ambient outside the vessel 50 of the second portion 20, and has a rim 52 for facing the surface 16.

The vessel 50 of the second portion 20 further comprises a peripheral seal 54 that extends around the rim 52 thereof for providing temporary sealing engagement of the vessel 50 of the second portion 20 with the surface 16 during use so as to prevent escaping of the liquid during use.

The peripheral seal 54 of the vessel 50 is physical pressure and a soft material.

The peripheral seal 54 of the vessel 50 is physical pressure and a gasket.

Figure 5:
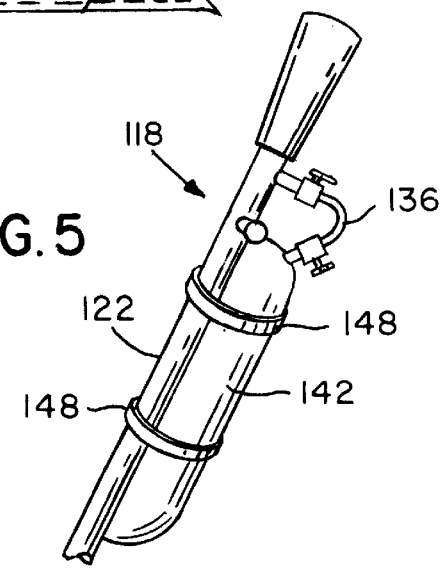
FIG. 5 is a diagrammatic perspective view of an alternate embodiment of the first portion of the present invention.

An alternate embodiment of the first portion 118 can best be seen in FIG. 5, and as such, will be discussed with reference thereto.

The first portion 118 is identical to the first portion 18, except that the harness 148 attaches the portable tank 142 directly to the pole 122 of the first portion 118, and with the hose 136 of the second portion 118 being appropriately sized.

It will be understood that each of the elements described above, or two or more together, may also find a useful application in other types of constructions differing from the types described above.

While the invention has been illustrated and described as embodied in a portable device for wearing by a user and removing deposits from a surface, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A portable device for wearing by a user and removing deposits from a surface, comprising;
   a) a first portion for delivering a fluid; and
   b) a second portion fluidly communicating with said first portion for overlying and dispensing said fluid onto and removing the deposits from the surface, wherein said first portion comprises a pole for hand-holding and which is slender, elongated, and has:
      i) a proximal end;
      ii) a distal end;
      iii) a main duct that runs axially therethrough from said proximal end thereof to said distal end thereof; and
      iv) a secondary duct that extends laterally from, and fluidly communicates with, said main duct in said pole, through said pole, in close proximity to said proximal end of said pole, wherein said first portion further comprises a fitting that fluidly engages in said secondary duct in said pole, and extends outwardly therefrom, wherein said first portion further comprises an elastomer that form fits to said proximal end of said pole for facilitating gripping by one hand of the user.

2. The device as defined in claim 1, wherein said first portion further comprises a handle that is slender and extends laterally outwardly from said pole of said first portion, in substantial diametrical alignment with said fitting for facilitating gripping by the other hand of the user.

3. A portable device for wearing by a user and removing deposits from a surface, comprising;
   a) a first portion for delivering a fluid; and
   b) a second portion fluidly communicating with said first portion for overlying and dispensing said fluid onto and removing the deposits from the surface, wherein said first portion comprises a pole for hand-holding and which is slender, elongated, and has:
      i) a proximal end;
      ii) a distal end;
      iii) a main duct that runs axially therethrough from said proximal end thereof to said distal end thereof; and
      iv) a secondary duct that extends laterally from, and fluidly communicates with, said main duct in said pole, through said pole, in close proximity to said proximal end of said pole, wherein said first portion further comprises a fitting that fluidly engages in said secondary duct in said pole, and extends outwardly therefrom, wherein said first portion further comprises a first valve that fluidly engages said fitting of said first portion, wherein said first portion further comprises a hose that fluidly engages said first valve of said first portion, and terminates in an end, wherein said first portion further comprises a second valve that fluidly engages said end of said hose, wherein said first portion further comprises a portable tank that fluidly engages said second valve of said first portion, and which contains said fluid, which flows through said second valve of said first portion when opened, through said hose of said first portion, until said fluid reaches said first valve of said first portion, which when opened, allows said fluid to flow into said fitting of said first portion and into said main duct in said pole, wherein said first portion further comprises a harness that is operatively connected to said portable tank for attaching said portable tank to the back of the user during use.

4. A portable device for wearing by a user and removing deposits from a surface, comprising;
   a) a first portion for delivering a fluid; and
   b) a second portion fluidly communicating with said first portion for overlying and dispensing said fluid onto and removing the deposits from the surface, wherein said first portion comprises a pole for hand-holding and which is slender, elongated, and has:
      i) a proximal end;
      ii) a distal end;
      iii) a main duct that runs axially therethrough from said proximal end thereof to said distal end thereof; and
      iv) a secondary duct that extends laterally from, and fluidly communicates with, said main duct in said pole, through said pole, in close proximity to said proximal end of said pole, wherein said first portion further comprises a fitting that fluidly engages in said secondary duct in said pole, and extends outwardly therefrom, wherein said first portion further comprises a first valve that fluidly engages said fitting of said first portion, wherein said first portion further comprises a hose that fluidly engages said first valve of said first portion, and terminates in an end, wherein said first portion further comprises a second valve that fluidly engages said end of said hose, wherein said first portion further comprises a portable tank that fluidly engages said second valve of said first portion, and which contains said fluid, which flows through said second valve of said first portion when opened, through said hose of said first portion, until said fluid reaches said first valve of said first portion, which when opened, allows said fluid to flow into said fitting of said first portion and into said main duct in said pole, wherein said first portion further comprises a harness that is operatively connected to said portable tank for attaching said portable tank to said pole of said first portion.

5. A portable device for wearing by a user and removing deposits from a surface, comprising;
   a) a first portion for delivering a fluid; and
   b) a second portion fluidly communicating with said first portion for overlying and dispensing said fluid onto and removing the deposits from the surface, wherein said first portion comprises a pole for hand-holding and which is slender, elongated, and has:
      i) a proximal end;
      ii) a distal end;
      iii) a main duct that runs axially therethrough from said proximal end thereof to said distal end thereof; and
      iv) a secondary duct that extends laterally from, and fluidly communicates with, said main duct in said pole, through said pole, in close proximity to said proximal end of said pole, wherein said second portion comprises a vessel that is inverted bowl-shaped, fluidly depends from said distal end of said pole so as to allow said fluid to flow from said pole of said first portion therein and be focused onto a specific and defined area while providing a barrier for containing said fluid from said surrounding area for maximum effect while keeping it a liquid longer by not allowing dilution and reaction to temperature of the ambient outside said vessel of said second portion, and has a rim for facing the surface.

6. The device as defined in claim 5, wherein said first portion further comprises a fitting that fluidly engages in said secondary duct in said pole, and extends outwardly therefrom.

7. The device as defined in claim 5, wherein said first portion further comprises a first valve that fluidly engages said fitting of said first portion.

8. The device as defined in claim 5, wherein said first portion further comprises a hose that fluidly engages said first valve of said first portion, and terminates in an end.

9. The device as defined in claim 5, wherein said first portion further comprises a second valve that fluidly engages said end of said hose.

10. The device as defined in claim 5, wherein said first portion further comprises a portable tank that fluidly engages said second valve of said first portion, and which contains said fluid, which flows through said second valve of said first portion when opened, through said hose of said first portion, until said fluid reaches said first valve of said first portion, which when opened, allows said fluid to flow into said fitting of said first portion and into said main duct in said pole.

11. The device as defined in claim 5, wherein said fluid contained in said portable tank of said first.

12. The device as defined in claim 5, wherein said liquid fluid contained in said portable tank of said first portion is liquid nitrogen.

13. The device as defined in claim 5, wherein said fluid contained in said portable tank of said first portion is a gas.

14. The device as defined in claim 5, wherein said distal end of said pole is bent obtusely so as to be perpendicular to the surface when said pole of said first portion is held at a comfortable angle by the user during use.

15. The device as defined in claim 5, wherein said vessel of said second portion comprises a peripheral seal that extends around said rim thereof for providing temporary sealing engagement of said vessel of said second portion with the surface during use so as to prevent escaping of said fluid.

16. The device as defined in claim 15, wherein said peripheral seal of said vessel is physical pressure and a soft material.

17. The device as defined in claim 15, wherein said peripheral seal of said vessel is physical pressure and a gasket.

* * * * *